(12) United States Patent
Boyer et al.

(10) Patent No.: US 10,289,731 B2
(45) Date of Patent: May 14, 2019

(54) SENTIMENT AGGREGATION

(71) Applicant: International Business Machines Corporation, Armonk, NY (US)

(72) Inventors: John M. Boyer, Victoria (CA); Scott N. Gerard, Wake Forest, NC (US); Srikanth G. Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 14/827,485

(22) Filed: Aug. 17, 2015

(65) Prior Publication Data

US 2017/0052971 A1    Feb. 23, 2017

(51) Int. Cl.
*G06F 17/30* (2006.01)

(52) U.S. Cl.
CPC .............................. *G06F 17/30719* (2013.01)

(58) Field of Classification Search
USPC ........................................................ 707/732
See application file for complete search history.

(56) References Cited

U.S. PATENT DOCUMENTS

| | | | |
|---|---|---|---|
| 8,463,595 B1 * | 6/2013 | Rehling ............ | G06F 17/30864 704/9 |
| 8,463,688 B2 | 6/2013 | Ritterman et al. | |
| 8,805,764 B1 * | 8/2014 | Rhines ..................... | G06N 5/02 706/46 |
| 9,129,008 B1 * | 9/2015 | Kuznetsov ........ | G06F 17/30038 |
| 2006/0242040 A1 | 10/2006 | Rader | |
| 2009/0265332 A1 * | 10/2009 | Mushtaq ................. | G06F 17/30 |
| 2009/0287678 A1 | 11/2009 | Brown et al. | |
| 2009/0306967 A1 | 12/2009 | Nicolov et al. | |
| 2009/0319342 A1 * | 12/2009 | Shilman ............ | G06F 17/30864 705/7.41 |
| 2011/0066587 A1 | 3/2011 | Ferrucci et al. | |
| 2011/0125734 A1 | 5/2011 | Duboue et al. | |
| 2012/0041937 A1 * | 2/2012 | Dhillon ............. | G06F 17/30731 707/708 |

(Continued)

OTHER PUBLICATIONS

"How Does NetBase Achieve the Best Accuracy for Understanding Consumers Online?", Netbase, Sep. 3, 2010, 10 pages.

(Continued)

*Primary Examiner* — Cam Linh T Nguyen
(74) *Attorney, Agent, or Firm* — Stephen R. Tkacs; Stephen J. Walder, Jr.; Diana R. Gerhardt

(57) ABSTRACT

A mechanism is provided in a data processing system for aggregating sentiment about an entity from a corpus of documents. The mechanism identifies a plurality of sentiment passages in the corpus of documents. Each of the plurality of sentiment passages includes a statement of sentiment about the entity. The mechanism determines a plurality of passage sentiment scores for the plurality of sentiment passages and an actual aggregate sentiment score from the plurality of passage sentiment scores based on a k-valued model. The mechanism determines a sentiment confidence score for the actual aggregate sentiment score based on the raw aggregate sentiment score and the actual aggregate sentiment score and presents the actual aggregate sentiment score and the sentiment confidence score.

20 Claims, 5 Drawing Sheets

(56) References Cited

U.S. PATENT DOCUMENTS

| | | | |
|---|---|---|---|
| 2012/0197950 A1* | 8/2012 | Dayal | G06Q 30/02 707/822 |
| 2013/0007055 A1 | 1/2013 | Brown et al. | |
| 2013/0066886 A1 | 3/2013 | Bagchi et al. | |
| 2013/0268262 A1 | 10/2013 | Moilanen et al. | |
| 2014/0052684 A1* | 2/2014 | Liao | G06N 5/02 706/46 |
| 2014/0337257 A1* | 11/2014 | Chatterjee | G06N 99/005 706/12 |
| 2014/0340531 A1* | 11/2014 | Jain | H04N 5/23222 348/207.1 |
| 2015/0066814 A1 | 3/2015 | Allen et al. | |
| 2015/0088894 A1* | 3/2015 | Czarlinska | G06F 17/30401 707/738 |
| 2015/0278835 A1* | 10/2015 | Hande | G06Q 30/0203 705/7.32 |
| 2015/0286627 A1* | 10/2015 | Chang | G06F 17/2705 704/9 |
| 2015/0286710 A1* | 10/2015 | Chang | G06F 17/30705 706/12 |
| 2015/0286928 A1* | 10/2015 | Demiralp | G06N 5/02 706/61 |
| 2016/0042359 A1* | 2/2016 | Singh | G06Q 30/016 704/2 |
| 2016/0132900 A1* | 5/2016 | Duggal | G06Q 30/0201 705/7.29 |

OTHER PUBLICATIONS

"Sentiment Analysis", Wikipedia, http://en.wikipedia.org/wiki/Sentiment_analysis, downloaded from the internet on Mar. 27, 2015, 7 pages.

"The Possibilities and Limitations of Sentiment Analysis", Dataversity, http://www.dataversity.net/the-possibilities-and-limitations-of-sentiment-analysis/, Apr. 4, 2011, 6 pages.

"The Truth About Sentiment & Natural Language Processing", Synthesio, Mar. 2011, 10 pages.

Case, Greg, "Applying Sentiment Analysis to Twitter", Solution Design Group, http://solutiondesign.com/applying-sentiment-analysis-to-twitter/, downloaded from internet on Mar. 27, 2015, 9 pages.

Grandi, Umberto et al., "A Borda Count for Collective Sentiment Analysis", Department of Mathematics University of Padova, Feb. 10, 2014, 27 pages.

Grandi, Umberto et al., "From Sentiment Analysis to Preference Aggregation", Department of Mathematics University of Padova, Nov. 22, 2013, 26 pages.

High, Rob, "The Era of Cognitive Systems: An Inside Look at IBM Watson and How it Works", IBM Corporation, Redbooks, Dec. 12, 2012, 16 pages.

Liu, Bing, "Sentiment Analysis and Subjectivity", Department of Computer Science, University of Illinois at Chicago, May 1, 2009, 38 pages.

McCord, M.C. et al., "Deep parsing in Watson", IBM J. Res. & Dev. vol. 56 No. 3/4 Paper 3, May/Jul. 2012, pp. 3:1-3:15.

Mukherjee, Subhabrata et al., "Sentiment Aggregation using ConceptNet Ontology", International Joint Conference on Natural Language Processing, Nagoya, Japan, Oct. 14-18, 2013, 9 pages.

Socher, Richard et al., "Recursive Deep Models for Semantic Compositionality over a Sentiment Treebank", Conference on Empirical Methods in Natural Language Processing (EMNLP 2013), Seattle, WA, Oct. 18-21, 2013, 12 pages.

Whitehead, Matthew et al., "Sentiment Mining Using Ensemble Classification Models", Indiana University School of Informatics, Dec. 28, 2009, 6 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

SENTIMENT AGGREGATION

BACKGROUND

The present application relates generally to an improved data processing apparatus and method and more specifically to mechanisms for sentiment aggregation.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method is provided in a data processing system for aggregating sentiment about an entity from a corpus of documents. The method comprises identifying a plurality of sentiment passages in the corpus of documents. Each of the plurality of sentiment passages includes a statement of sentiment about the entity. The method further comprises determining a plurality of passage sentiment scores for the plurality of sentiment passages and determining an actual aggregate sentiment score from the plurality of passage sentiment scores based on a k-valued model. The method further comprises determining a sentiment confidence score for the actual aggregate sentiment score based on the raw aggregate sentiment score and the actual aggregate sentiment score and presenting the actual aggregate sentiment score and the sentiment confidence score.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
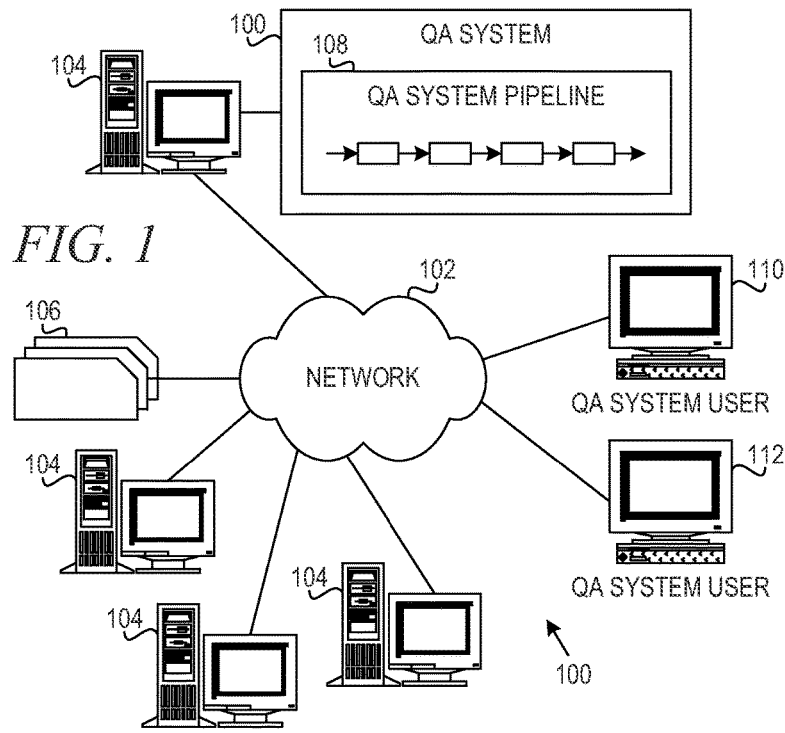
FIG. 1 depicts a schematic diagram of one illustrative embodiment of a question/answer creation (QA) system in a computer network.

The illustrative embodiments provide mechanisms for sentiment aggregation. The mechanisms of the illustrative embodiments mine for sentiment passages about entities of interest from a corpus of documents with the intention of providing an aggregate sentiment about each entity based on the passages found. During ingestion, annotators identify entities of interest and ultimately passages that express sentiments about those entities. Sentiment polarity may be represented as a tri-state value of positive, neutral, or negative. The roadmap for the solution includes the concept of recognizing greater linguistic conviction of the sentiment. This would increase the number of states to at least five or seven by introducing strong and/or weak positive and negative sentiment scores for each passage, which exacerbates the sentiment aggregation problem.

As a specific example, a document of the corpus may contain the following sentence: "We expect an increase in the short sells of Acme Corporation over the next three months." The entity is Acme, and the sentiment is negative. The linguistic conviction is a simple matter of degree, such as "We expect a sharp increase in the short sells . . . " for a strong negative sentiment, or "We have a strong buy rating on XYZ corp." as an example of a strong positive sentiment.

Given a set of sentiment passages about an entity, each passage having a k-valued sentiment score (e.g., k=3 for positive, neutral, negative), the mechanisms of the illustrative embodiments determine an aggregate sentiment score for the entity across a corpus of documents. When a clear majority of the sentiment passages have the same sentiment score and the minority of the passages are scored with other scores, then it is reasonable to take the majority sentiment as the aggregate sentiment. It is satisfying when a number of likes far outweighs a number of dislikes, but it is not so satisfying when it is very close, similar to a barely won election.

Furthermore, there is an exacerbating factor. Even in the simple tri-state sentiment case, the neutral state is a state of sentiment that is distinguishable from a simple informational statement. For example, "We recommend a hold rating on ABC corp." is a statement of sentiment about what one should do with ABC's shares, which is distinct from non-sentiment pieces of information, such as "ABC is headquartered in Silicon Valley." In this case of k>2 sentiment score values, the nave solution of taking the score with the greatest number is worsened because the sentiment values are not mutually independent of one another. In fact, they are totally ordered, i.e., negative is less than neutral, neutral is less than positive, and therefore negative is more less than positive than neutral is. Therefore, as an example, it is quite unsatisfactory to recommend a sell rating for a stock when there are eleven sell recommendations, ten hold recommendations, and ten buy recommendations.

The challenge involves how to break a tie or near-tie. For example, if there are ten buy ratings, ten hold ratings, and zero sell ratings, it is unsatisfying to report an aggregate score of "unknown" because the sentiment passages include important information, which is that one should not sell the stock. These cases of no clear majority seem to create weak signals between the sentiment score states defined. For example, with only positive, neutral, and negative values, if there are ten positives, ten neutrals, and zero negatives, the aggregate sentiment could be a "weak positive." The problem is that this conflicts with the roadmap, particularly when the system is upgraded to reflect linguistic convictions, such as weak positive and strong positive. The in-between states become really weak positive, somewhat strong positive, etc. This solution becomes untenable because it does not handle a result that is somewhat between but not exactly half-way between two defined sentiment scores.

The mechanisms of the illustrative embodiments determine an aggregate sentiment for an entity based on a set of k-value (k is typically odd) sentiment scores of passage using (at least) two indicators:

1) An aggregate sentiment actual score having one of the k values selected based on an aggregate sentiment raw score determined by a mathematical function operating over at least a subset of the k-value sentiment scores of the passages.

2) A confidence value determined based on a mathematical function operating over a primary sentiment score and a secondary sentiment score.

To aid understanding of the generalized core idea above, the following provides several specifics of one embodiment of the core idea:

let the raw aggregate sentiment score be the mathematical average of the individual k-valued sentiment scores of the passages;

let the final aggregate sentiment score be the closest k-valued value to the aggregate sentiment raw score;

let the primary confidence sentiment score be the aggregate sentiment actual score;

let the secondary confidence sentiment score be the aggregate sentiment raw score; and let the mathematical function be one minus the absolute value of subtracting the confidence primary sentiment score and the confidence secondary sentiment score.

In this embodiment, the confidence value would be related to the numeric proximity of the aggregate sentiment raw score and the aggregate sentiment actual score. For one example, consider zero sell, eight hold, and two buy ratings. For the purpose of the example, let sell be represented by −1, hold by 0, and buy by +1. Then, the aggregate sentiment raw score would be 0.2, so the aggregate sentiment actual score would be 0, representing a hold rating, and the confidence would be 0.8 (80%). For a second example, consider zero sell, six hold, and four buy ratings. This case would also yield an aggregate sentiment actual score of 0, but the aggregate sentiment raw score is 0.4 and the confidence value would be only 0.6 (60%).

There are a number of other embodiments of this strategy, as well as a number of additional features and indicators that can further enhance the information provided by the illustrative embodiments, as will be described in further detail below.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
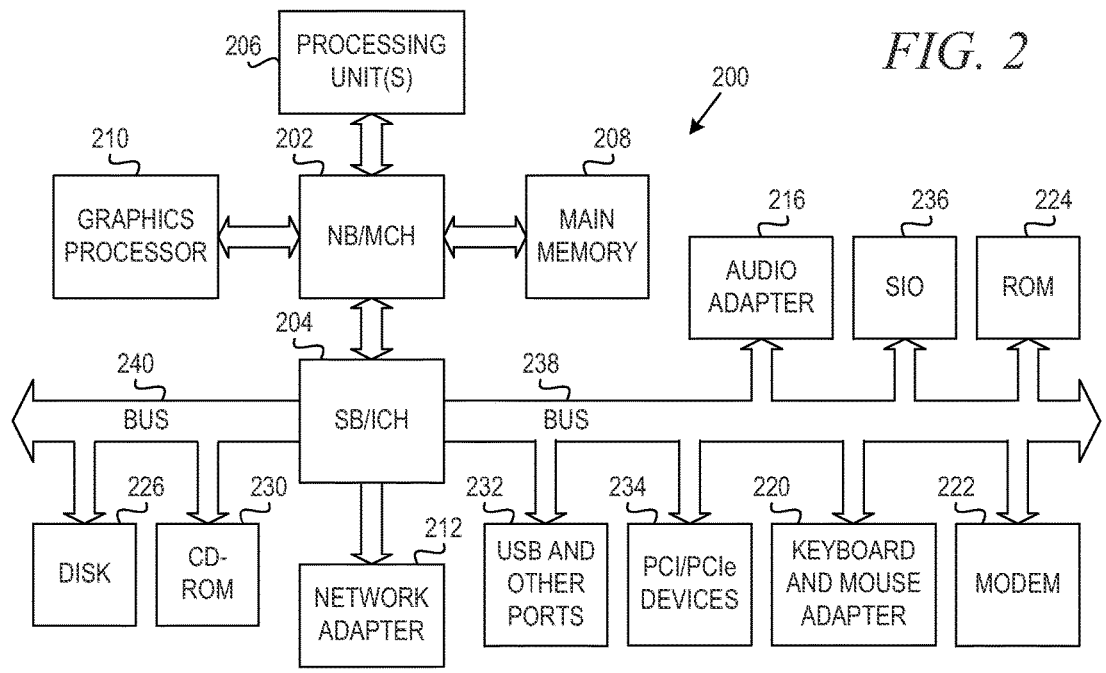
FIG. 2 is a block diagram of an example data processing system in which aspects of the illustrative embodiments are implemented.
Figure 3:
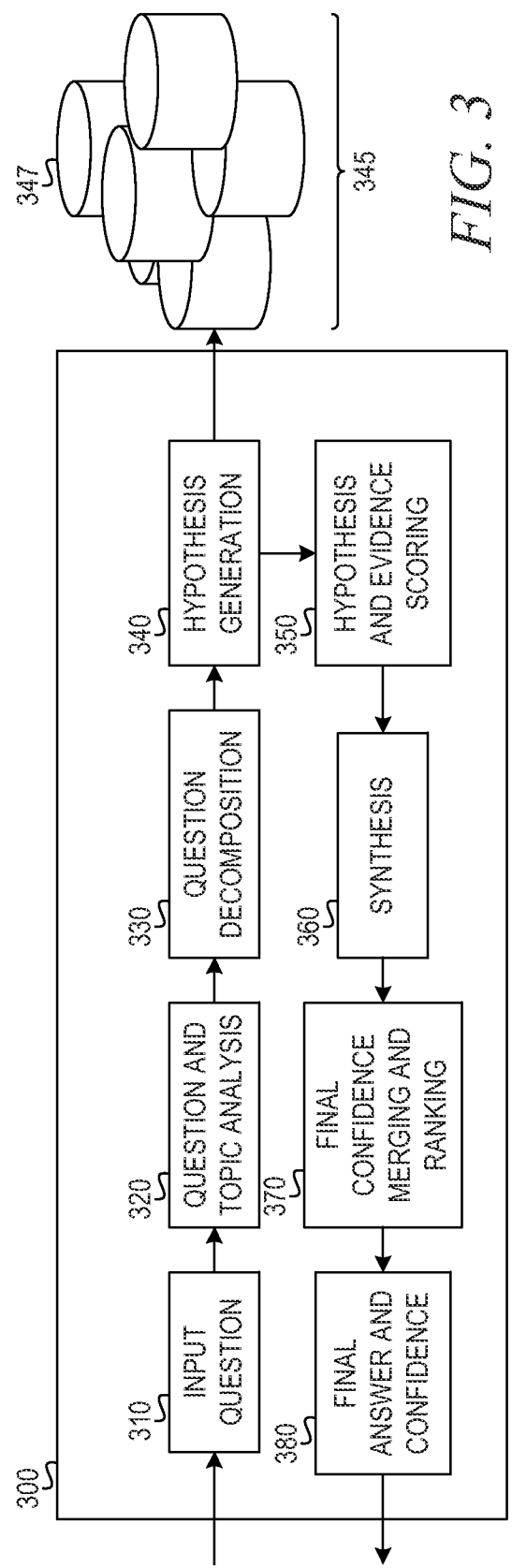
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to aggregating sentiment from a corpus of documents.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these questions and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes arty file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers white in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, QA system users at clients 110, 112 submit questions to QA system 100, which generates candidate answers from corpus documents 106 and determines an authority score for each source of an answer. One or more reasoning algorithms or stages of QA system pipeline 108 determine an authority score based on the topic of the question that was asked. The mechanisms of the illustrative embodiments aggregate sentiment scores about an entity from a corpus of documents.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "what drug" since if this phrase were replaced with the answer, e.g., the answer "Adderall" can be used to replace the phrase "what drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a tower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

In accordance with the illustrative embodiments, final confidence merging and ranking phase 370 and/or final answer and confidence phase 380 include reasoning algorithms for determining an aggregate sentiment score for entities from a corpus of documents providing evidentiary support for answers. Operation of a mechanism for aggregating sentiment is described in further detail below with reference to FIGS. 4-8.

Figure 4:
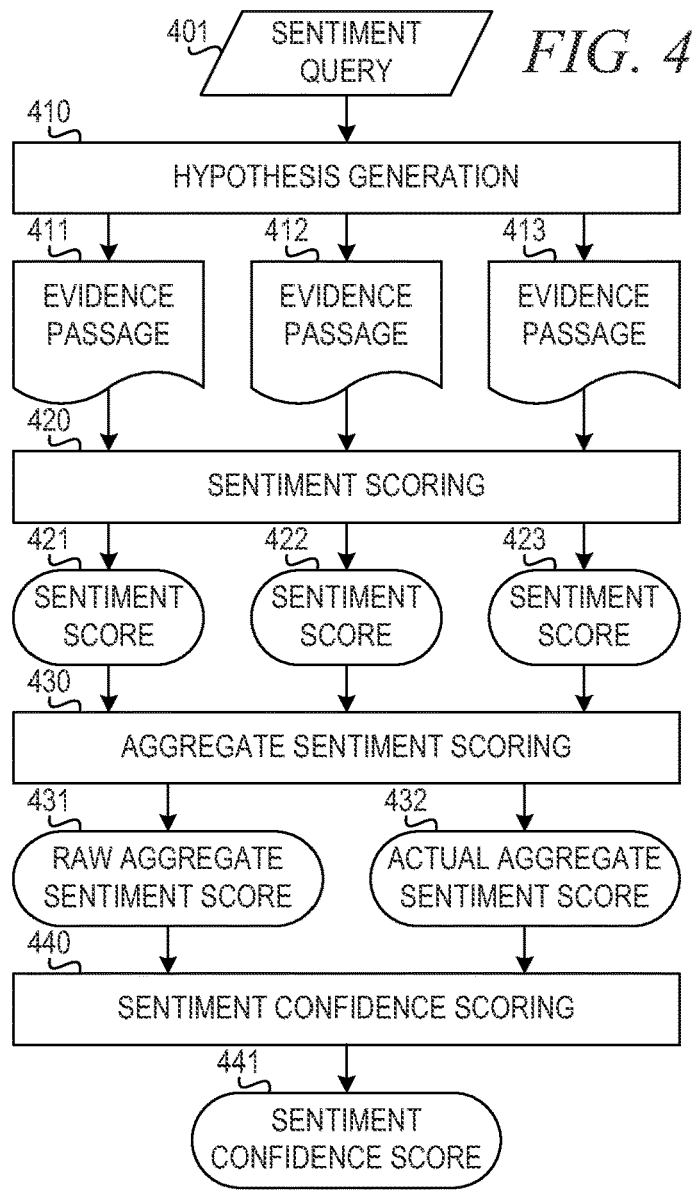
FIG. 4 is a block diagram illustrating a mechanism for aggregating sentiment in accordance with an illustrative embodiment.

FIG. 4 is a block diagram illustrating a mechanism for aggregating sentiment in accordance with an illustrative embodiment. Hypothesis generation component 410 receives sentiment query 401 and identifies a plurality of evidence passages 411, 412, 413 with expressions of sentiment. Sentiment query 401 identifies an entity for which the questioner wants to determine an aggregate sentiment. Sentiment query 401 may include only the name of the entity. In an alternative embodiment, sentiment query 401 may include a question, such as, "Should I buy shares of Acme Corporation?" or "What is the sentiment about XYZ Corp.?"

Sentiment scoring component 420 generates a plurality of sentiment scores 421, 422, 423 based on the evidence passages 411, 412, 413. For example, consider a k-valued sentiment score where k=3. For the purpose of the example, let sell/negative be represented by −1, hold/neutral by 0, and buy/positive by +1. In the example, evidence passage 411 states, "We expect an increase in short sells of Acme Corporation over the next 3 months," and evidence passage 412 states, "We have a buy rating on Acme Corporation." In this case, sentiment scoring 420 determines sentiment score 421 corresponding to evidence passage 411 is sell/negative or −1 and sentiment score 422 corresponding to evidence passage 412 is buy/positive or 1. The depicted example shows three evidence passages 411-413 and three sentiment scores 421-423; however, in practice, the corpus of documents may reveal many more evidence passages. In other instances, the corpus of documents may reveal only one or two evidence passages having a sentiment statement about the entity.

Aggregate sentiment scoring component 430 receives sentiment scores 421-423 and aggregates the sentiment from the plurality of evidence passages 411-413 into a raw aggregate sentiment score. In accordance with an illustrative embodiment, aggregate sentiment scoring component 430 determines raw aggregate sentiment score 431 using a mathematical function of the plurality of sentiment scores 421-423. In one example embodiment, the mathematical function may be a simple function, such as an average function, although more sophisticated mathematical functions may be used within the scope of the illustrative embodiments.

Thus, in one example embodiment, sentiment scoring component 420 determines the aggregate sentiment score by assigning a 0 (zero) score to the neutral sentiment, assigning preceding increasingly negative integer scores to the increasingly negative sentiments, and assigning succeeding increasingly positive integer scores to increasingly positive sentiments. Aggregate sentiment scoring component 430 determines the raw aggregate sentiment score 431 as the mathematical average (arithmetic mean) of the sentiment scores 421-423 of the sentiment passages 411-413. Aggregate sentiment scoring component 430 then determines the actual aggregate sentiment score as the closest integral value to the raw aggregate sentiment score 432, or using a selected function, such as ceiling or floor if the raw aggregate sentiment score 431 is equal to the midpoint between two sentiment values. The actual aggregate sentiment score 432 represents an actual sentiment value, such as neutral, positive, weak negative, or the like.

Sentiment confidence scoring component 440 receives raw aggregate sentiment score 431 and actual aggregate sentiment score 432. Sentiment confidence scoring component 440 determines a sentiment confidence score 441 representing a confidence for the actual aggregate sentiment score 432. Sentiment confidence scoring component 440 determines a value A as the absolute value of the actual aggregate sentiment score 432 minus the raw aggregate sentiment score 431. In accordance with an example embodiment, sentiment confidence scoring component 440 determines sentiment confidence score 441 based on the following formula:

confidence=1−A·ε, where ε (epsilon) is selected to truncate the confidence to the range 0 to 1. In response to sentiment query 401, aggregate sentiment scoring component 430 returns actual aggregate sentiment score 432 and sentiment confidence scoring component 440 returns sentiment confidence score 441.

Figure 5:
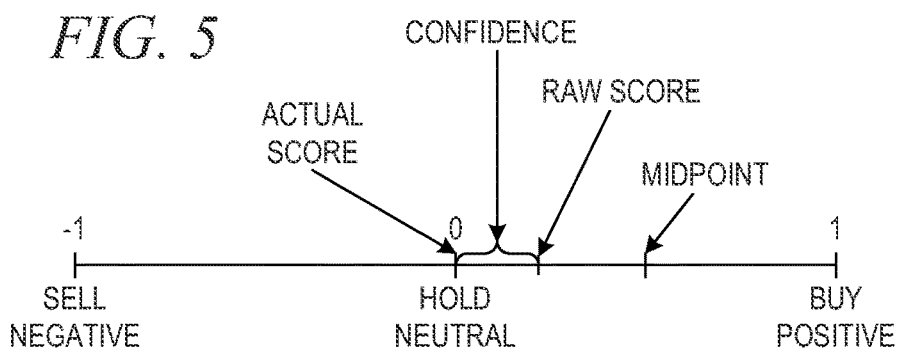
FIG. 5 illustrates key components of determining sentiment confidence for an aggregate sentiment score in accordance with an illustrative embodiment.

FIG. 5 illustrates key components of determining sentiment confidence for an aggregate sentiment score in accordance with an illustrative embodiment. In the depicted example, the raw aggregate sentiment score derived from a set of sentiment passage scores is about 0.25. The midpoint between the neutral and positive rating is 0.5 in this example. The raw score is between 0 and 1, but is closer to 0, so the aggregate sentiment scoring component selects the actual aggregate sentiment score of 0. The sentiment confident scoring component determines the confidence score based on the gap between the raw aggregate sentiment score and the selected actual aggregate sentiment score.

In accordance with an example embodiment, the sentiment confidence scoring component uses a variable epsilon value in the above equation. With an epsilon value of 1, the confidence ranges between 50% and 100%, whereas a higher epsilon value would produce lower than 50% confidence values as the raw aggregate sentiment score approaches the midpoint between the actual aggregate sentiment score and its predecessor or successor value. Similarly, an epsilon value less than 1 would produce greater than 50% confidence as the raw aggregate sentiment score approaches the midpoint. This may be useful when other factors described below are used to further affect confidence.

In another example embodiment, the sentiment confidence scoring component negatively affects the sentiment confidence score based on the spread in the data. For example, if the raw aggregate sentiment score comes from highly polarized data, e.g., a dominantly bimodal data set, then that should reduce confidence relative to the same raw aggregate sentiment score obtained from sentiment scores clustered closer to only the actual aggregate sentiment score. The sentiment confidence scoring component may use various techniques to determine sentiment confidence scores based on data spread.

One technique is to calculate the standard deviation of the individual passage sentiment scores. A larger standard deviation would reduce confidence by a greater amount than a smaller standard deviation, For example, given a standard deviation of S, the sentiment confidence scoring component divides the sentiment confidence score by (1+S) to form the adjusted sentiment confidence score.

A challenge with using certain statistical functions like standard deviation is that they rely on assumptions about the data, such as a normal distribution of the passage sentiment scores, which may be inappropriate. An alternative is to use a technique that measures the extent to which the data is clustered about the raw aggregate sentiment score. One such method is referred to herein as the median segment span method. The sentiment confidence scoring component arranges the passage sentiment scores in sorted order. The sentiment confidence scoring component selects a portion P of the total number N of data values, such as 50% (i.e., P=N*50%, or whatever percentage is selected). The sentiment confidence scoring component selects the median P values as the median segment. The sentiment confidence scoring component determines the span of the median segment as the difference between the greatest and the least sentiment scores within the median segment. A greater span decreases confidence relative to a lesser span of the median segment. For example, given a span value S, the sentiment confidence scoring component divides the confidence score by S to form the adjusted sentiment confidence score.

Figure 6:
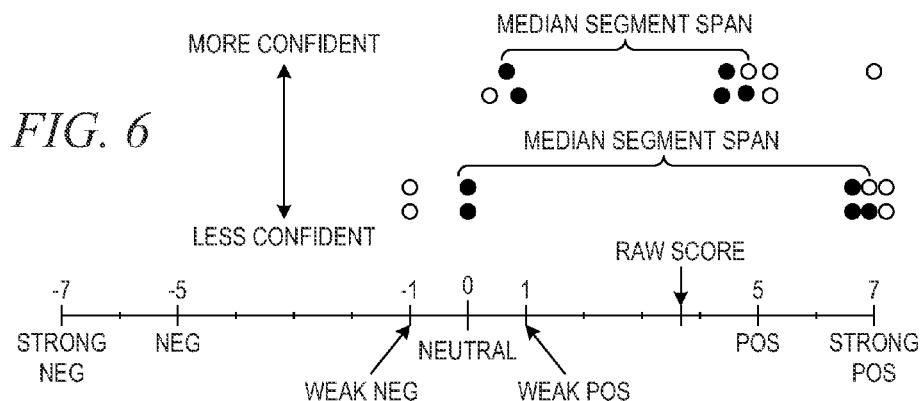
FIG. 6 illustrates an example of determining a sentiment confidence score based on data spread in accordance with an illustrative embodiment.

FIG. 6 illustrates an example of determining a sentiment confidence score based on data spread in accordance with an illustrative embodiment. The span in which the data could exist is +/−7. The median segment of the data with the lesser spread spans from sentiment scores 1 to 5. The median segment of the data with the greater spread spans from the sentiment score 0 to 7. This figure also shows variable intervals between the sentiment values, which is described in further detail below.

In another example embodiment, the sentiment confidence scoring component performs a mathematical weighted average based on a weight assignment for each passage sentiment score. There are a number of potential factors that could contribute to a weight assignment for a sentiment passage. One factor is the source of the sentiment passage, where a more authoritative or trusted source would correspond to a higher weight assignment to the passage's sentiment score. Another source of weight for a sentiment passage could be linguistic conviction. Yet another source of weight for a sentiment passage could be a weight system that determines the extent to which a sentiment passage directly relates to the focus entity about which sentiment is being aggregated. For example, if a question asks for an aggregate sentiment about the financial outlook of a corporation, then financial aspects such as revenue, profit, and earnings per share have a different amount of bearing on the corporation's financial outlook. These relative weights can be determined by experts and may be refined manually or via a machine learning technique. Furthermore, the weights may be affected by the context of the question. For example, if a user asks, "Should I buy stock in XYZ Corporation?" then it is important to assess the weighted aggregate outlook of XYZ in the context of the investment objectives of the user e.g., regular income versus long-term growth).

When the sentiment confidence scoring component uses a weighted average calculation to determine the raw aggregate sentiment score, the median segment span method described above is adjusted to account for the weight of the values, rather than just their number. The sentiment confidence scoring component determines a total weight W of the data set. Then, the sentiment confidence scoring component selects the portion P of the total weight of the data values, such as 50% (i.e., P=W*50%). The sentiment confidence scoring component sorts the data set of sentiment passages using passage sentiment score as the primary key and the weight of the sentiment score as the secondary key. Within the array of sentiment scores and weights at positions after the median value, let $S_1, \ldots, S_j$ denote the subarrays of elements that each contain the subset of equally valued sentiment scores. For i=1 to j, the sentiment confidence scoring component inverts the elements in subarray $S_i$ so that elements having the particular sentiment score V but a larger weight W are moved closer to the position of the median value. This inversion makes the subarray after the median value position symmetric with the secondary key sorting of the subarray before the median value, i.e., on both sides of the median value position, if two elements have the same sentiment score, then the data element having the larger weight appears closer to the median value position. Given this arrangement of the data set, the median segment is initialized to be the median value position, and the accumulated weight AW of the median segment is initialized to the weight associated with the median value. The sentiment confidence scoring component adds the immediate predecessor and successor of the current median segment to the median value and adds the weights of the predecessor and successor to AW. If the median segment has no predecessor, then the sentiment confidence scoring component adds only the successor's weight to AW. If the median segment has no successor, then the sentiment confidence scoring component adds only the predecessor's weight to AW. This iterative expansion of the median segment continues until AW becomes greater than or equal to P, the desired median segment weight.

In accordance with another example embodiment, the sentiment confidence scoring component includes a third indicator of directionality of the confidence. For example, if the aggregate sentiment scoring component gives a neutral actual aggregate sentiment score and the sentiment confidence scoring component determines a confidence of 50%, then it would help to know that the confidence is in favor of the positive side versus the negative side of the actual aggregate sentiment score.

In yet another example embodiment, the sentiment confidence scoring component includes a fourth indicator of a trend score. For a particular sentiment target or entity, the aggregate sentiment scoring component caches the underlying raw aggregate sentiment score over time, such as by taking a daily or other regular measure of the aggregate sentiment. The sentiment confidence scoring component can use the slope of a line of best fit on the cached raw scores, optionally attenuated for recency or a date range, as well as the approximate rate at which the aggregate sentiment is increasing or decreasing, as an indicator of whether the sentiment is trending positively or negatively. As a specific example of value to a user, if a company stock's actual aggregate sentiment score corresponds to a neutral or "hold" recommendation but is trending positive rapidly away from the "sell" side, then a risk-tolerant investor may be inclined to buy the stock while it is still early in the upward trend.

The sentiment confidence scoring component can send the trend score independently or optionally affect the confidence rating based on the trend score. If the raw aggregate sentiment score is trending toward the actual aggregate sentiment score, then the sentiment confidence component can use this to increase the confidence score relative to what is otherwise computed. For example, the sentiment confidence scoring component can use the line of best fit to predict the next raw score value and then compute the confidence for the predicted raw score. The sentiment confidence scoring component can use the better of the two confidence values.

In another example embodiment, the sentiment scoring component can assign non-consecutive ascending and descending integers to the succeeding positive and preceding negative sentiment score value. This would enable the ability to model the relative importance of weakness or strength of positive or negative sentiment scores. As a concrete example, shown for example in FIG. 6, the sentiment scoring component assigns the numbers [−7, −5, −1, 0, 1, 5, 7] to the sentiments [strong negative, negative, weak negative, neutral, weak positive, positive, strong positive]. This example model places little emphasis on weak results relative to a neutral rating and a much stronger emphasis on a clear positive or negative result. This example model also places only a little extra emphasis on a strong positive or strong negative rating.

In an alternative assignment, it may make more sense to place the greatest emphasis on only the strong results, which could be achieved with an assignment, such as the following: [−5, −2, −1, 0, 1, 2, 5]. As another example, the assignment of sentiment scores may be non-symmetrical with respect to the neutral rating. For example, such an assignment may be as follows: [−5, −2, −1, 0, 1, 5, 7]. This assignment places more emphasis on positive ratings than negative ratings. In the example described above, when doing mathematical averaging, the smaller absolute values in the negative space mean less emphasis is placed on the negativity than on the positive side.

In another example embodiment, the sentiment confidence scoring component amends the confidence calculation, specifically the calculation of the accumulated weight A described above, in order to accommodate for a span greater than one between some of the consecutive sentiment scores. Let R denote the raw aggregate sentiment score, let S denote the actual aggregate sentiment score, let L denote the nearest sentiment value that is less than the raw score R, and let U denote the nearest sentiment value greater than the raw score R. In order to accommodate for U−L>1, the sentiment confidence scoring component computes the value A using ABS(S−R)/(U−L).

In yet another example embodiment, the sentiment confidence scoring component determines the confidence according to a non-linear function. A linear formula, such as the formula shown above, linearly relates confidence with proximity of the raw aggregate sentiment score to the actual aggregate sentiment score. In this embodiment, the sentiment confidence scoring component uses a non-linear function to treat closer proximity with much more confidence relative to the linear formula, such as with the following formula:

$$\text{confidence} = 1 - \sqrt{A} \cdot \varepsilon,$$

where ε (epsilon) is selected to truncate the confidence to the range 0 to 1, and the value A is the absolute value of the actual aggregate sentiment score 432 minus the raw aggregate sentiment score 431. Using this formula, confidence degrades at a greater rate than in the linear formula.

Figure 7A:
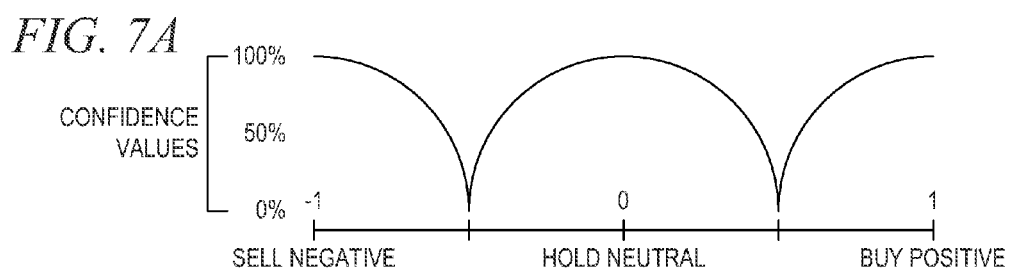
FIGS. 7A-7C illustrate non-linear sentiment confidence functions in accordance with an illustrative embodiment.
Figure 7B:
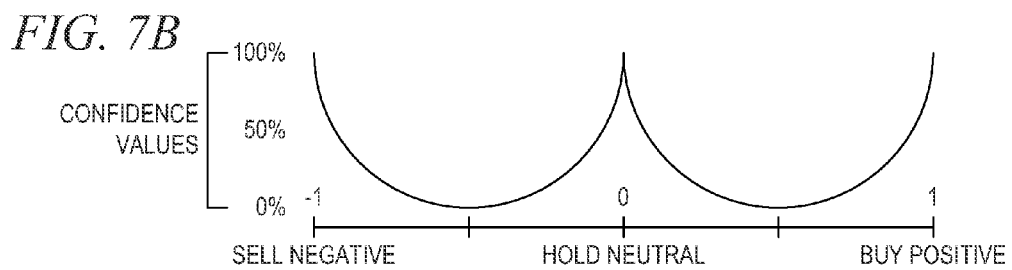
Figure 7C:
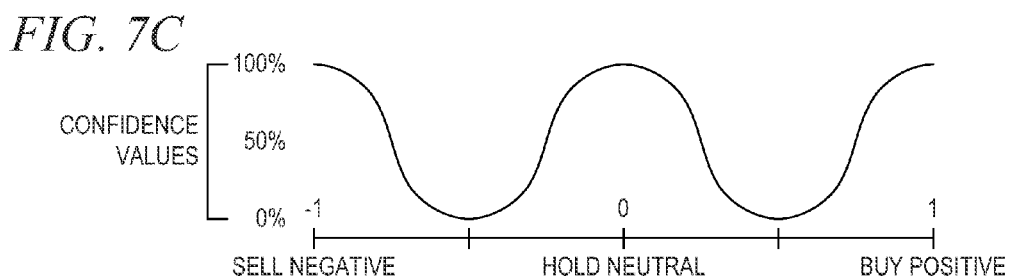

FIGS. 7A-7C illustrate non-linear sentiment confidence functions in accordance with an illustrative embodiment. More particularly, FIG. 7A illustrates the non-linear confidence formula shown above. The confidence values associated with raw aggregate sentiment scores degrade slowly for raw aggregate sentiment scores trending toward the midpoints according to a concave down curve that bottoms out at the midpoints between the sentiment values. Each confidence curve begins at a sentiment value with a 100% confidence and meets at the midpoint another confidence curve that then extends from the midpoint to the adjacent sentiment value.

A different non-linear formula could be used to impose a greater overall penalty on confidence, relative to the linear formula, for raw aggregate sentiment scores at greater distances from their corresponding actual aggregate sentiment score. One such formula is the following:

$$\text{confidence} = 1 - (2A)^2 \cdot \varepsilon,$$

where ε (epsilon) is selected to truncate the confidence to the range 0 to 1, and the value A is the absolute value of the actual aggregate sentiment score 432 minus the raw aggregate sentiment score 431. FIG. 7B illustrates the non-linear confidence formula shown above. The confidence values associated with raw aggregate sentiment scores degrade rapidly as they tend toward the midpoints according to a concave up curve that bottoms out at the midpoints between the sentiment values. Each confidence curve begins at a sentiment value with a 100% confidence, and meets at the midpoint another confidence curve that then extends from the midpoint to the adjacent sentiment value.

FIG. 7C illustrates another non-linear confidence formula in accordance with yet another example embodiment. Other non-linear functions may be used within the spirit and scope of the illustrative embodiments.

In another example embodiment, sentiment score values for sentiment classes have no order. The sentiment classes are simply k distinct classes, but they cannot be laid out on a number line that enables them to be compared. In this case, the number or weight of individual sentiment passages in one of the k classes makes no "weak signal" about any of the other classes since they are incomparable. Let Count(j) denote the number of passage sentiment scores for the sentiment class j, and let Count(1 . . . k) denote the sum for j=1 to k of Count(j), which is the total number of passage sentiment scores.

Under this embodiment, the actual aggregate sentiment score is the class j with the largest count (i.e., the mode of the set of passage sentiment scores). There are multiple ways to compute a confidence for the aggregate of this result. The following embodiment focuses on the notion of a "confirming versus discontinuing" confidence calculation. Let the primary sentiment score C be Count(j), the number of passage sentiment scores that confirm the actual aggregate sentiment score selected. Let the secondary sentiment score D be Count(1 . . . k)−Count(j), the number of passage sentiment scores that disconfirm the actual aggregate sentiment score selected.

Let the mathematical function computing the confidence value be the following:

$$\text{confidence} = \frac{(k - (D/C) - 1)}{(k - 1)}$$

In the case of highest confidence, when all passage sentiment scores are confirming, the value of D will be 0 and so the formula produces the value 1 (100%). In the case of the lowest confidence values, the primary sentiment score is still the mode, so C/Count(1 . . . k) approaches the fraction 1/k, and D/Count(1 . . . k) approaches (k−1)/k. Substituting into the mathematical function, the numerator approaches 0, and therefore so does the confidence.

Note that this basic formula is relative punitive on the confidence values except when the confirming passage sentiment scores are highly dominant. Since the range of the above basic formula is 0 to 1, this can be remedied by applying a fractional power. Furthermore, as the number of sentiment classes k increases, the size of C that would signify a strong confirmation decreases, and the method can be tuned to accommodate for this by relating the fractional power to k. For a specific example embodiment, let the mathematical function computing the confidence be the following:

$$\left[\frac{(k - (D/C) - 1)}{(k - 1)}\right]^{(1/k)}$$

Finally, in an alternative form of the above example embodiments in which the sentiment classes have no defined order, the notion of weighted passage sentiment scores is applied to determining the actual aggregate sentiment score and the sentiment score confidence. Let sum(j) denote the sum of the weighted passage sentiment scores for those sentiment passages in sentiment class j, and let sum(1 . . . k) denote the sum of all the weighed passage sentiments scores. The actual aggregate sentiment score is determined to be the sentiment class j with the greatest sum of weighted passage sentiment scores. Then, let the confirming or primary sentiment score C be sum(j), and let the disconfirming or secondary sentiment score D be sum(1 . . . k)−sum(j). The sentiment confidence score is determined using one of the formulae above corresponding to the example embodiment of which the weighted alternative form is being determined.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirety on the user's computer, partly on the user's computer, as a stand-alone software package, partly on the user's computer and partly on a remote computer or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
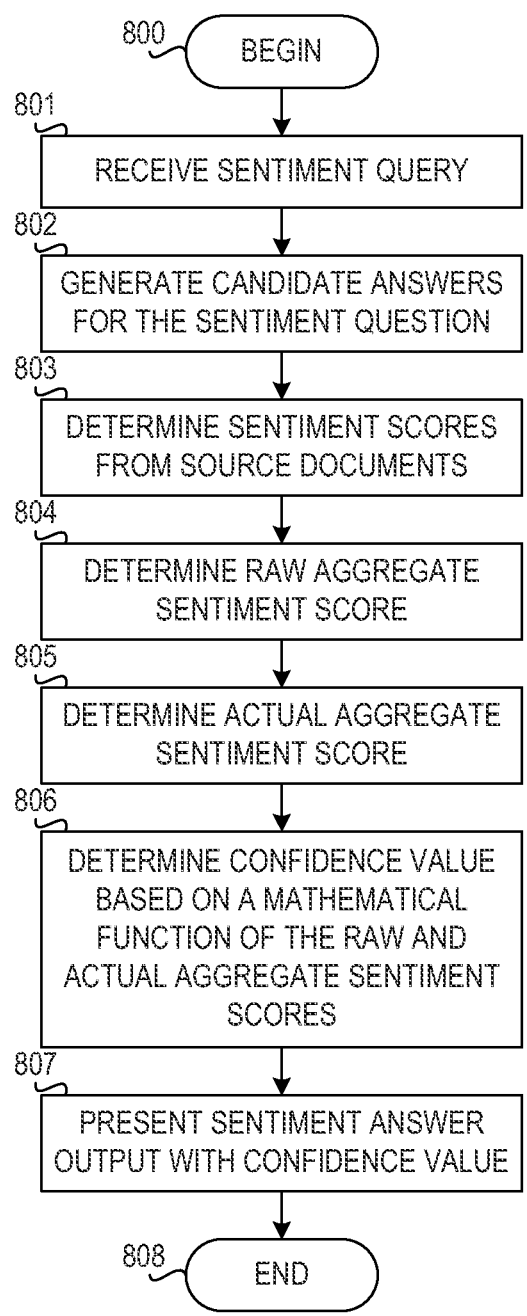
FIG. 8 is a flowchart illustrating operation of a mechanism for determining an aggregate sentiment with a confidence score in accordance with an illustrative embodiment.

FIG. 8 is a flowchart illustrating operation of a mechanism for determining an aggregate sentiment with a confidence score in accordance with an illustrative embodiment. Operation begins (block 800), and the mechanism receives a sentiment query (block 801). The sentiment query may be identification of an entity for which sentiment is desired or a question about the sentiment of an entity. The mechanism generates candidate answers for the sentiment question (block 802). The candidate answers are hypotheses based on sentiment passages from a corpus of documents.

The mechanism determines sentiment scores from the sentiment passages in the source documents (block 803). The sentiment scores may be based on an ordered k-valued model, as described above. For example, for k=7, the mechanism ma assign the numbers [−7, −5, −1, 0, 1, 5, 7] to the sentiments [strong negative, negative, weak negative, neutral, weak positive, positive, strong positive]. In another embodiment, the sentiment scores may be based on a non-ordered k-valued model.

The mechanism determines a raw aggregate sentiment score based on the sentiment scores of the sentiment passages (block 804). In one example embodiment, the mechanism determines the raw aggregate sentiment score as a mathematical average of the plurality of sentiment scores from the source documents. In another example embodiment, the mechanism determines the raw aggregate sentiment score using a mathematical weighted average based on a weight assignment for each passage sentiment score.

Then, the mechanism determines an actual aggregate sentiment score based on the raw aggregate sentiment score (block 805). In one embodiment, the mechanism determines the actual aggregate sentiment score as the closest sentiment value in the k-valued model. The mechanism then determines a confidence value based on a mathematical function of the raw and actual aggregate sentiment scores (block 806). In one embodiment, the mechanism uses a linear mathematical function based on the raw and actual aggregate sentiment scores. In an alternative embodiment, the mechanism uses a non-linear function. In another example embodiment, the mechanism adjusts the confidence value based on data spread. In further embodiments, the mechanism may determine a directionality of the aggregate sentiment and/or a trend score representing a trend of the aggregate sentiment.

The mechanism presents the aggregate sentiment answer output with the determined confidence value in response to the received sentiment query (block 807). Thereafter, operation ends (block 808).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide a mechanism for sentiment aggregation based on a corpus of documents. The mechanism provides a machine-reasoned, definite recommendation about the focus entity of a set of sentiment passages. The mechanism provides a separately articulated confidence value for the recommendation based on the amount of disparity in the wisdom of the crowd that created the set of sentiment passages. The mechanism accommodates for the way a customer's corpus documents are written, i.e., expressing direct sentiments about single entities rather than preference sentiments about entity pairs. This is important because a customer may not have the ability to control how the corpus documents are written. The mechanism also targets the important customer use case of sentiment systems having more than two-valued like/dislike sentiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a sentiment aggregation system for aggregating sentiment about an entity from a corpus of documents, the method comprising:
   receiving, by the sentiment aggregation system, a sentiment query that identifies an entity for which a questioner wants to determine an aggregate sentiment;
   identifying, by a hypothesis generation component executing within the sentiment aggregation system, a plurality of sentiment passages in the corpus of documents, wherein each of the plurality of sentiment passages includes a statement of sentiment about the entity;
   determining, by a sentiment scoring component executing within the sentiment aggregation system, a plurality of passage sentiment scores for the plurality of sentiment passages;
   determining, by an aggregate sentiment scoring component executing within the sentiment aggregation system, an actual aggregate sentiment score that is an aggregate of the plurality of passage sentiment scores over the plurality of sentiment passages based on a k-valued model, wherein determining the actual aggregate sentiment score comprises determining a raw aggregate sentiment score of the plurality of passage sentiment scores and then selecting an integral value in the k-valued model that is mathematically closest to the raw aggregate sentiment score;
   determining by a sentiment confidence scoring component executing within the sentiment aggregation system, a sentiment confidence score for the actual aggregate sentiment score based on the raw aggregate sentiment score and the actual aggregate sentiment score; and
   presenting, by the sentiment aggregation system, the actual aggregate sentiment score and the, sentiment confidence score to the questioner.

2. The method of claim 1, wherein determining the plurality of passage sentiment scores for the plurality of sentiment passages comprises:
   for each sentiment passage, determining a sentiment score based on the k-valued model.

3. The method of claim 1, wherein determining the raw aggregate sentiment score comprises determining a mathematical average of the plurality of passage sentiment scores.

4. The method of claim 1, wherein determining the raw aggregate sentiment score comprises determining a mathematical weighted average of the plurality of passage sentiment scores based on a weight assignment for each passage sentiment score.

5. The method of claim 1, wherein determining the sentiment confidence score comprises determining the magnitude of the mathematical distance between the actual aggregate sentiment score and the raw aggregate sentiment score, and then scaling the magnitude to the range 0 to 1.

6. The method of claim 1, wherein determining the sentiment confidence score for the actual aggregate sentiment score comprises determining a spread measurement for the plurality of passage sentiment scores and then applying a mathematical function that inversely relates the spread measurement to the range 0 to 1.

7. The method of claim 1, further comprising determining a directionality of the actual aggregate sentiment score based upon whether the actual aggregate sentiment score is less than, greater than, or equal to the raw aggregate sentiment score.

8. The method of claim 1, further comprising determining to trend score representing whether the raw aggregate sentiment score is less than, greater than, or equal to a raw aggregate sentiment score obtained at a previous time.

9. The method of claim 1, wherein the actual aggregate sentiment score is determined to be the sentiment class with a greatest representation in the plurality of passage sentiment scores; and wherein the sentiment confidence score is determined using a mathematical function that represents the amount of confirming versus disconfirming evidence for the actual aggregate sentiment score in the plurality of passage sentiment scores.

10. A computer program product comprising a computer readable storage medium having a computer readable program stored therein, wherein the computer readable program, when executed on a computing device, causes the computing device to implement a sentiment aggregation system for aggregating sentiment about an entity from a corpus of documents , wherein the computer readable program causes the computing device to:

receive, by the sentiment aggregation system , a sentiment query that identifies an entity for which a questioner wants to determine an aggregate sentiment;

identify, by a hypothesis generation component executing within the sentiment aggregation system, a plurality of sentiment passages in the corpus of documents, wherein each of the plurality of sentiment passages includes a statement of sentiment about the entity;

determine, by a sentiment scoring component executing within the sentiment aggregation system, a plurality of passage sentiment scores for the plurality of sentiment passages;

determine, by and aggregate sentiment scoring component executing within the sentiment aggregation system, an actual aggregate sentiment score that is an aggregate of the plurality of passage sentiment scores over the plurality of sentiment passages based on a k-valued model, wherein determining the actual aggregate sentiment score comprises determining a raw aggregate sentiment score of the plurality of passage sentiment scores and then selecting an integral value in the k-valued model that is mathematically closest to the raw aggregate sentiment score;

determine, by a sentiment confidence scoring component executing within the sentiment aggregation system, a sentiment confidence score for the actual aggregate sentiment score based on the raw aggregate sentiment score and the actual aggregate sentiment score; and present, by the sentiment aggregation system, the actual aggregate sentiment score and the sentiment confidence score to the questioner.

11. The computer program product of claim 10, wherein determining the plurality of passage sentiment scores for the plurality of sentiment passages comprises:

for each sentiment passage, determining a sentiment score based on the k-valued model.

12. The computer program product of claim 10, wherein determining the raw aggregate sentiment score comprises determining a mathematical average of the plurality of passage sentiment scores.

13. The computer program product of claim 10, wherein determining the raw aggregate sentiment score comprises determining a mathematical weighted average of the plurality of passage sentiment scores based on a weight assignment for each passage sentiment score.

14. The computer program product of claim 10, wherein determining the sentiment confidence score for the, actual aggregate sentiment score comprises determining a spread measurement fix the plurality of passage sentiment scores and then applying a mathematical function that inversely relates the spread measurement to the range 0 to 1.

15. The computer program product of claim 10, wherein the computer readable program further causes the computing device to determine a directionality of the actual aggregate sentiment score based upon whether the actual aggregate sentiment score is less than, greater than, or equal to the raw aggregate sentiment score.

16. The computer program product of claim 10, wherein the computer readable program further causes the computing device to determine a trend score representing whether the raw aggregate sentiment score is less than, greater than, or equal to a raw aggregate sentiment score obtained at a previous time.

17. The computer program product of claim 10, wherein the actual aggregate sentiment score is determined to be the sentiment class with a greatest representation in the plurality of passage sentiment scores; and wherein the sentiment confidence score is determined using a mathematical function that represents an amount of confirming versus disconfirming evidence for the actual aggregate sentiment score in the plurality of passage sentiment scores.

18. An apparatus comprising:

a processor; and a memory coupled to the processor, wherein the memory comprises instructions which, when executed by the processor, cause the processor to implement a sentiment aggregation system for aggregating sentiment about an entity from a corpus of documents, wherein the instructions cause the processor to:

receive, by the sentiment aggregation system, a sentiment query that identifies an entity for which a questioner wants to determine an aggregate sentiment;

identify, by a hypothesis generation component executing within the sentiment aggregation system, a plurality of sentiment passages in the corpus of documents, wherein each of the plurality of sentiment passages includes a statement of sentiment about the entity;

determine, by a sentiment scoring component executing within the sentiment aggregation system, a plurality of passage sentiment scores for the plurality of sentiment passages;

determine, by an aggregate sentiment scoring component executing within the sentiment aggregation system, an actual aggregate sentiment score that is an aggregate of the plurality of passage sentiment scores over the plurality of sentiment passages based on a k-valued model, wherein determining the actual aggregate sentiment score comprises determining a raw aggregate sentiment score of the plurality of passage sentiment scores and then selecting an integral value in the k-valued model that is mathematically closest to the raw aggregate sentiment score;

determine, by a sentiment confidence scoring component executing within the sentiment aggregation system, a sentiment confidence score for the actual aggregate sentiment score based on the raw aggregate sentiment score and the actual aggregate sentiment score; and present, by the sentiment aggregation system, the actual aggregate sentiment score and the sentiment confidence score to the questioner.

19. The apparatus of claim 18, wherein the instructions cause the processor to determine a directionality of the actual aggregate sentiment score based upon whether the actual aggregate sentiment score is less than, greater than, or equal to the raw aggregate sentiment score.

20. The apparatus of claim 18, wherein the instructions cause the processor to determine a trend score representing whether the raw aggregate sentiment score is less than, greater than, or equal to a raw aggregate sentiment score obtained at a previous time.

* * * * *